United States Patent [19]

Doi et al.

[11] Patent Number: 4,753,516

[45] Date of Patent: Jun. 28, 1988

[54] ANTI-REFLECTION PLATE FOR DISPLAY DEVICE

[75] Inventors: Toshiki Doi, Osaka; Takanori Fujita, Ehime; Yukio Yasunori, Osaka, all of Japan

[73] Assignee: Sumitomo Chemical Company, Limited, Osaka, Japan

[21] Appl. No.: 55,053

[22] Filed: May 28, 1987

[30] Foreign Application Priority Data

May 29, 1986 [JP] Japan .................... 61-125383

[51] Int. Cl.$^4$ .......................... G02B 1/10; G02B 27/00
[52] U.S. Cl. ...................... 350/321; 350/164; 350/276 R; 427/164
[58] Field of Search .............. 350/321, 322, 1.6, 1.7, 350/276 R, 276 SL, 284, 164; 427/64, 165, 163, 164, 167, 168, 214, 255.6

[56] References Cited

U.S. PATENT DOCUMENTS

| | | | |
|---|---|---|---|
| 3,698,928 | 10/1972 | Blome | 350/276 R |
| 4,013,465 | 3/1977 | Clapham et al. | 350/276 R |
| 4,114,983 | 9/1978 | Maffitt et al. | 350/276 R |
| 4,294,950 | 10/1981 | Kato | 427/164 |
| 4,374,158 | 2/1983 | Taniguchi et al. | 427/164 |
| 4,379,180 | 4/1983 | Baglin et al. | 427/164 |
| 4,434,191 | 2/1984 | Cook et al. | 427/165 |
| 4,599,272 | 7/1986 | Ichikawa | 427/164 |

Primary Examiner—John K. Corbin
Assistant Examiner—Loha Ben
Attorney, Agent, or Firm—Birch, Stewart, Kolasch & Birch

[57] ABSTRACT

An anti-reflection plate for a display device, including a transparent substrate wherein, on one or both surfaces of the substrate, a flat first layer consisting of a transparent hardening agent containing a silicon-containing organic compound has been applied and dried and, on the first layer, a second layer consisting of a transparent hardening agent containing a silicon-containing compound has been spray coated and hardened to form an uneven surface having projections each having a height of 0.1 to 2.0 $\mu$m in height, a diameter of 10 to 100 $\mu$m and a height/diameter ratio of 1/30 to 1/500 can effectively prevent reflection of external light on a screen of a display device without deteriorating the resolution of an image on the screen.

7 Claims, No Drawings

ANTI-REFLECTION PLATE FOR DISPLAY DEVICE

BACKGROUND OF THE INVENTION

1. Field of the Invention

The present invention relates to an anti-reflection plate for a display device such as a CRT (cathode-ray tube), a light emitting diode and the like. More particularly, the invention relates to an anti-reflection plate which is installed in or placed on a screen of the display device to prevent or decrease reflection of external light on the screen and has good abrasion resistance, moisture resistance, and chemical resistance.

2. Description of the Prior Art

When a display device comprising such as a CRT, a light emitting diode, a liquid crystal and a plasma display (e.g., a TV set, a watch or clock, an electronic calculator, etc.) is used in daylight or under lighting, external light reflects on the surface of the screen of the display device or a surface of a transparent plate covering the screen so that the screen has glare, contrast of the displayed image is deteriorated or the image on the screen becomes less visible.

To overcome such problems caused by the reflection of the external light, various anti-reflection plates have been proposed. These anti-reflection plates include the following:

(1) A transparent plate such as a methacrylic resin or glass plate a surface of which is physically or chemically roughened.

This anti-reflection plate has greatly decreased light transmission so that the image on the screen becomes too dark to read even under the normal conditions since unevenness of the screen surface is too deep or the shape of each projection is too sharp. In addition, although the anti-reflection plate can suppress glaring of the screen since it randomly reflects the external light, it cannot decrease the amount of the reflected light so that the surface of the anti-reflection plate becomes light and in turn the image on the screen becomes less visible.

(2) A transparent synthetic resin plate onto which surface unevenness is transferred by means of a physically or chemically roughened glass plate or a roughened roll.

This anti-reflection plate has the same disadvantages as that of the anti-reflection plate (1). Further, it is easily damaged and has poor chemical resistance.

(3) An anti-reflection plate consisting of a mechanically roughened transparent substrate coated with a transparent material to form unevenness on the surface.

Since the mechanically formed unevenness of the substrate is too deep or the shape of each projection is too sharp as described in the above plate (1), the unevenness of the coated material is still deep so that it is very difficult to read the image on the screen of the display device. Furthermore, it is difficult to control the thickness of the coating of the transparent material which reflects the external light.

(4) An anti-reflection plate consisting of a transparent substrate and a coating of a transparent material containing a delustering agent.

This anti-reflection plate has several drawbacks such as whitening of the coating due to a difference in refractive indexes between the coating material and the delustering agent, irregularity or scattering of the unevenness due to sedimentation or agglomeration of the delustering agent.

In addition, any of the conventional anti-reflection plates tends to be easily damaged on its surface, and the damages or flaws on the surface decrease the properties and commercial value of the anti-reflection plates.

As described above, the anti-reflection plate should have the glare shield effect which is achieved by scattering the external light by suitable unevenness of the surface and resolution of the image displayed on the screen of the display device. However, the conventional methods for roughening the surface of the anti-reflection plate are not satisfactory, and the anti-reflection plates are not sufficient from the viewpoint of preventing flaws on the surface.

SUMMARY OF THE INVENTION

One object of the present invention is to provide an anti-reflection plate for a display device, which does not suppress scattering of the light from the display device and can maintain good readability of the image on the screen of the display device.

Another object of the present invention is to provide an anti-reflection plate for a display device, which can prevent glare caused by external light by scattering it.

A further object of the present invention is to provide a flaw-free anti-reflection plate having good mechanical and chemical properties such as abrasion resistance and chemical resistance.

According to the present invention, there is provided an anti-reflection plate for a display device, which plate comprises a transparent substrate wherein, on one or both surfaces of the substrate, a flat first layer consisting of a transparent hardening agent containing a silicon-containing organic compound has been applied and dried and, on the first layer, a second layer consisting of a transparent hardening agent containing a silicon-containing compound has been spray coated and hardened to form an uneven surface having projections each having a height of 0.1 to 2.0 $\mu$m, preferably 0.1 to 1.2 $\mu$m, a diameter of 10 to 100 $\mu$m and a height/diameter ratio of 1/30 to 1/500.

DETAILED EXPLANATION OF THE INVENTION

The anti-reflection plate according to the present invention is attached on the screen of the display device to prevent reflection of the external light so as to improve the readability of the image on the screen. Therefore, the anti-reflection plate is required to be transparent and to have good resolution, that is, the image can be clearly read through the anti-reflection plate without any blur.

When the projection of the unevenness formed on the surface of the anti-reflection plate of the present invention has a height lower than 0.1 $\mu$m, the anti-reflection plate hardly prevents reflection of the external light. When the projection of the unevenness has a height higher than 20 $\mu$m, the anti-reflection plate has poor resolution so that the image on the screen cannot be read clearly.

When the diameter of the most of the projections is less than 10 $\mu$m, the image on the screen cannot be clearly read irrespective of the height of the projections. When the diameter is larger than 100 $\mu$m, the anti-reflection plate has decreased anti-reflection effects.

When the height/diameter ratio of the projection is larger than 1/30, the resolution of the anti-reflection plate is deteriorated. When this ratio is smaller than 1/500, the anti-reflection plate has deteriorated anti-reflection effects.

The substrate of the anti-reflection plate may be made of any transparent materials. Preferred examples of the transparent material are methacrylic resins, polycarbonate resins, acrylonitrile-styrene copolymer resins, methyl methacrylate-styrene copolymer resins, polyvinyl chloride resins, glass and the like. Among them, the methacrylic resins are more preferable because of their excellent transparency, surface hardness, adhesion, etc.

As the transparent hardening agent containing the silicon-containing organic compound, those not containing any material that roughens the surface of the coated layer (e.g. a delustering agent) are preferred. Examples of the transparent hardening agent containing the silicon-containing organic compound are colloidal silica, an alkoxysilane, a mixture of two or more of alkoxysilanes, a partially hydrolized alkoxysilane and a partially condensated alkoxysilane. The transparent hardening agent may optionally contain a polymer such as an acrylic polymer, a vinyl acetate base polymer and the like.

Specific examples of the alkoxysilanes are tetraalkoxysilanes of the formula:

alkyltrialkoxysilanes of the formula:

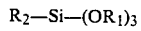

and dialkyldialkoxysilanes of the formula:

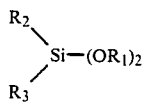

wherein $R_1$, $R_2$ and $R_3$ are the same or different and are each an alkyl group having 1 to 5 carbon atoms, an acetoxy group, a vinyl group, a (meth)acryloxy group, an allyl group, a phenyl group, a glycidyl group, an alkylthiol group having 1 to 5 carbon atoms in the alkyl group or an alkylamino group having 1 to 5 carbon atoms in the alkyl group.

In addition to the above described colloidal silica and alkoxysilane, the transparent hardening agent containing the silicon-containing organic compound to be used to form the first layer may contain water or an acid which is necessary for hydrolysis, and as a diluent, a solvent such as alcohols (e.g., methanol, ethanol, propanol, butanol), ketones (e.g., acetone, methyl ethyl ketone, methyl isobutyl ketone), esters (e.g., ethyl acetate, methyl acetate, isopropyl acetate, isobutyl acetate), cellosolves (e.g., methylcellosolve, ethylcellosolve, butylcellosolve, cellosolve acetate), carboxylic acids (e.g., formic acid, acetic acid, propionic acid), aromatic hydrocarbons (e.g., benzene, toluene, xylene, mesitylene) and halides. The kinds of such additives depend on several factors such as the kind of substrate, and the evaporation rate of the additives. A mixing ratio of the transparent hardening agent containing the silicon-containing organic compound and the additive(s) may vary in a wide range. Among the solvents, a lower alkyl carboxylic acid such as formic acid and acetic acid is useful since it improves the adhesiveness of the layer to the substrate and stability of the layer.

The transparent hardening agent containing the silicon-containing organic compound to be used to form the second layer should contain 70 to 90% by weight of a diluent having a boiling point of 110° C. to 200° C. to form the desired unevenness on the surface. When the prepared hardening agent contains a sufficient amount of the diluent, it can be directly used. However, when the amount of the diluent is not sufficient, an additional amount of the diluent is added to the hardening agent. When the amount of the diluent having a boiling point of 110° to 200° C. is less than 70% by weight, the degree of the unevenness is greatly affected by external factors such as atmospheric temperature so that the uneven surface is not formed reproducibly. In addition, the height/diameter ratio of the projection becomes large so that it is hardly controlled to less than 1/30. When the amount of the diluent is more than 90% by weight, the height/diameter ratio of the projection becomes small so that it is hardly controlled to a ratio of more than 1/500.

Specific examples of the diluent having a boiling point of 110° to 200° C. are aromatic hydrocarbons (e.g., toluene, xylene), ketones (e.g., methyl isobutyl ketone, cyclohexanone), cellosolve (methylcellosolve, ethylcellosolve, butylcellosolve), alcohols (e.g., amyl alcohol, n-butanol), etc.

To form the flat first layer, the transparent hardening agent is applied on the surface of the substrate by any of conventional method such as dip coating, spray coating, flow coating and the like. The applied transparent hardening agent is then dried at room temperature (or slightly elevated temperature). Thereafter, the transparent hardening agent for the second layer is applied on the flat first layer and hardened. To form minute unevenness on the surface, the second layer is applied by spray coating such as air spraying, airless spraying, electrostatic coating, ultrasonic spraying or centrifugal spraying. Other coating methods which can uniformly form fine particles of the coating may be used to apply to the second layer.

The second layer may be coated twice or more to decrease surface gloss and form the uniform particles of the coating.

The anti-reflection coating comprising the above first and second layers may be formed directly on at least one surface of the substrate. When the transparent hardening agent of the first layer has insufficient adhesiveness with the surface of the substrate, a suitable primer can be supplied between the substrate and the first layer. Examples of the primer are aromatic hydrocarbons (e.g., toluene, xylene), esters (e.g., ethyl acetate), ketones (e.g., acetone, methyl isobutyl ketone, methyl ethyl ketone), ethers (e.g., tetrahydrofuran, dioxane) or mixtures thereof, one or more of them containing a dissolved (meth)acrylic polymer or a silane or titan type coupling agent.

The substrate material may contain a suitable additive such as a coloring agent, an anti-static agent, a filler, a UV absorber, a heat absorber and the like. On the substrate, a polarizing film or membrane, a metal mesh, a synthetic fiber mesh with metal plating or the like may be laminated or bonded.

When the anti-reflection plate of the present invention is used as a cover of any display device such as a CRT installed in a TV set or a terminal of a computer or word processor, a liquid crystal display, a plasma display, a light emitting diode display and an electroluminescence display, reflection of the external light is suppressed without deteriorating the readability of the image on the screen of the display and prevents any adverse effects caused by the display device.

Practical and presently preferred embodiments of the present invention are shown in the following Examples wherein parts and % are by weight unless otherwise indicated.

In the Examples, one of following coating compositions was used:

COATING COMPOSITION

Composition A 100 parts of partial hydrolyzate of organosiloxane prepared by refluxing a mixture of isopropanol (68 g), tetraethoxysilane (38 g), methyltriethoxysilane (72 g) and 0.05N hydrochloric acid (36 g); 20 parts of a copolymer prepared by thermally polymerizing butyl acrylate (40 g) and 2-hydroxyethyl methacrylate (10 g) in the presence of azobis-isobutyronitrile (0.5 g) in ethyl alcohol (300 g) and pouring the reaction product in petroleum ether;
0.4 parts of sodium acetate;
20 parts of acetic acid;
40 parts of n-butanol
Viscosity: 10 centipoise (20° C.)
Content of the diluent: 33.3%
(n-butanol and acetic acid)

Composition B 100 parts of Composition A;
25 parts of toluene;
75 parts of methyl isobutyl ketone;
100 parts of butylcellosolve
Viscosity: 2.5 centipoise (20° C.)
Content of the diluent: 77.8%
(n-butanol, acetic acid, toluene, methyl isobutyl ketone and butylcellosolve)

Composition C 100 parts of Composition A;
25 parts of toluene;
75 parts of methyl isobutyl ketone;
30 parts of butylcellosolve
Viscosity: 4 centipoise
Content of the diluent: 71.0%

Composition D 100 parts of Composition A;
15 parts of toluene;
55 parts of methyl isobutyl ketone;
Viscosity: 7 centipoise (20° C.)
Content of the diluent: 60.7%

Composition E 100 parts of Composition A;
15 parts of toluene;
44 parts of methyl isobutyl ketone;
Viscosity: 8 centipoise
Content of the diluent: 58.0%

Composition F 100 parts of Composition A
100 parts of toluene
100 parts of methyl isobutyl ketone
100 parts of butylcellosolve
Viscosity: 2 centipoise
Content of the diluent: 83.3%

EXAMPLES 1–5

On a methacrylic resin plate (Sumipex (trade mark) -000 sold by Sumitomo Chemical Company Ltd.), the composition A was spray coated with an air spray gun having a nozzle of 1.5 mm in diameter from a distance of 20 cm under an air pressure of 3 kg/cm$^2$ at a discharging rate of 100 ml/min. and dried at room temperature for 10 minutes to form a flat first layer. Then, the composition B was coated with an air spray gun having a nozzle of 1.5 mm in diameter from a distance of 30 cm under conditions shown in Table 1 followed by thermal hardening in a oven kept at 80° C. for 2 hours to prepare an anti-reflection plate having a double layered anti-reflection film.

Since the anti-reflection plate is required to have little gloss at an angle of 20° (glare shielding) and high transmission of parallel rays (resolution), the following tests were carried out on the anti-reflection plate:

(1) Gloss

Gloss at an angle of 20° of the anti-reflection plate was measured according to JIS Z 8741.

(2) Maximum height of the Projections

The maximum height of the projections was measured along a standard length of 2.5 mm according to JIS B 0601.

(3) Diameter of the Projections

By means of a surface roughness meter, Surfcom 30C (Tokyo Seimitsu Kabushikikaisha), surface conditions of the anti-reflection plate were measured and distribution of diameters of the projections was calculated.

(4) Transmission of Parallel Ray and Diffused Light Transmission

The transmission of parallel rays and diffused light transmission were measured according to JIS K 7105.

(5) Pencil Hardness

Pencil hardness of the anti-reflection film was measured according to JIS K 5400.

The results are shown in Table 2.

TABLE 1

| | Conditions for coating the composition B | | |
|---|---|---|---|
| Example No. | Air Pressure (kg/cm$^2$) | Discharging rate (ml/min) | Moving rate of air gun (cm/sec) |
| 1 | 3 | 25 | 30 |
| 2 | 7 | 25 | 40 |
| 3 | 4 | 40 | 40 |
| 4 | 3 | 30 | 30 |
| 5 | 2 | 30 | 20 |

TABLE 2

| | Properties of the anti-reflection plate | | | | | |
|---|---|---|---|---|---|---|
| | Projections | | | | Transmission | |
| Example No. | Max. height (μm) | Diameter*$^2$ (μm) | Height/ diameter | Gloss*$^1$ (%) | of parallel ray (%) | Pencil hardness |
| 1 | 0.2 | 15–30 | 1/120–1/300 | 100 | 93 | 4H |

TABLE 2-continued

| Example No. | Projections Max. height (μm) | Projections Diameter*2 (μm) | Height/ diameter | Gloss*1 (%) | Transmission of parallel ray (%) | Pencil hardness |
|---|---|---|---|---|---|---|
| 2 | 0.2 | 10-20 | 1/100-1/250 | 95 | 93 | 4H |
| 3 | 0.4 | 60-90 | 1/300-1/460 | 100 | 92 | 4H |
| 4 | 0.3 | 20-50 | 1/140-1/400 | 83 | 91 | 4H |
| 5 | 0.8 | 40-90 | 1/100-1/250 | 75 | 90 | 4H |

Note:
*1 Including reflection on the back surface.
*2 Diameter range which includes the most of the projection diameters.

The anti-reflection plates of Examples 1-5 had gloss at an angle of 20° of less than 100% and high transmission of parallel rays, which means that they had good anti-reflection properties and resolution of transmitted images.

EXAMPLES 6-7 AND COMPARATIVE EXAMPLES 1-2

In the same manner as in Example 1 but using the composition C (Example 6. Content of the diluent: 71.0%), the composition F (Example 7. Content of the diluent: 83.3%), the composition D (Comparative Example 1. Content of the diluent: 60.7%) or the composition E (Comparative Example 2. Content of the diluent: 58.0%) in place of the composition B and spraying the second layer composition under the following conditions, an anti-reflection plate was prepared:

| Spraying conditions | |
|---|---|
| Air pressure: | 3 kg/cm² |
| Discharging rate: | 25 ml/min. |
| Moving rate of air gun: | 30 cm/sec. |

The properties of the anti-reflection plates are shown in Table 3.

TABLE 3

| | Projections Max. height (μm) | Projections Diameter (μm) | Gloss (%) | Diffused light transmission (%) |
|---|---|---|---|---|
| Example 1 | 0.2 | 15-30 | 100 | 0.3 |
| Example 6 | 1.0 | 20-50 | 99 | 0.6 |
| Example 7 | 0.1 | 15-30 | 110 | 0.2 |
| Com. Ex. 1 | 1.4 | 60-100 | 75 | 2.8 |
| Com. Ex. 2 | 2.5 | 60-100 | 74 | 7.0 |

The anti-reflection plates of Examples 1, 6 and 7 using the compositions B, C and F, respectively and low diffused light transmission and good resolution of transmitted image.

What is claimed is:

1. An anti-reflection plate for a display device, which plate comprises a transparent substrate wherein, on one or both surfaces of the substrate, a flat first layer consisting of a transparent hardening agent containing a silicon-containing organic compound has been applied and dried and, on the first layer, a second layer consisting of a transparent hardening agent containing a silicon-containing compound has been spray coated and hardened to form an uneven surface having projections each having a height of 0.1 to 2.0 μm, a diameter of 10 to 100 μm and a height/diameter ratio of 1/30 to 1/500.

2. The anti-reflection plate according to claim 1, wherein the transparent hardening agent for forming the second layer contains 70 to 90% by weight of a diluent having a boiling point of 110° C. to 200° C. under atmospheric pressure.

3. The anti-reflection plate according to claim 2, wherein the diluent is one selected from a group consisting of toluene, xylene, methyl isobutyl ketone, cellosolve, methylcellosolve, butylcellosolve, cellosolve acetate, cyclohexanone, amyl alcohol, n-butanol and mixtures thereof.

4. The anti-reflection plate according to claim 1, wherein the transparent hardening agent in at least one of said layers contains colloidal silica.

5. The anti-reflection plate according to claim 1, wherein the transparent hardening agent in at least one of said layers contains at least one silane compound selected from the group consisting of an alkoxysilane, a partially hydrolized alkoxysilane and a partially condensated alkoxysilane.

6. The anti-reflection plate according to claim 5, wherein the alkoxysilane is one selected from the group consisting of a tetraalkoxysilane of the formula:

$$Si-(OR_1)_4$$

an alkyltrialkoxysilane of the formula:

$$R_2-Si-(OR_1)_3$$

and a dialkyldialkoxysilane of the formula:

$$\begin{array}{c} R_2 \\ \diagdown \\ Si-(OR_1)_2 \\ \diagup \\ R_3 \end{array}$$

wherein $R_1$, $R_2$ and $R_3$ are the same or different and are each an alkyl group having 1 to 5 carbon atoms, an acetoxy group, a vinyl group, a (meth)acryloxy group, an allyl group, a phenyl group, a glycidyl group, an alkylthiol group having 1 to 5 carbon atoms in the alkyl group or an alkylamino group having 1 to 5 carbon atoms in the alkyl group.

7. The anti-reflection plate according to claim 1 wherein said projections have a height of 0.1 to 1.2 μm.

* * * * *